(12) United States Patent
D'Hulster et al.

(10) Patent No.: US 9,523,457 B2
(45) Date of Patent: Dec. 20, 2016

(54) APPARATUS AND METHOD FOR HEAT CURING OF PIPE LINERS

(75) Inventors: Gerald Scott D'Hulster, Clearwater, FL (US); James Gould, Clearwater, FL (US)

(73) Assignee: Perma-Liner Industries, Inc., Clearwater, FL (US)

(*) Notice: Subject to any disclaimer, the term of this patent is extended or adjusted under 35 U.S.C. 154(b) by 921 days.

(21) Appl. No.: 13/308,810

(22) Filed: Dec. 1, 2011

(65) Prior Publication Data

US 2012/0193011 A1 Aug. 2, 2012

Related U.S. Application Data

(63) Continuation-in-part of application No. 13/195,566, filed on Aug. 1, 2011, now Pat. No. 9,074,719.

(Continued)

(51) Int. Cl.

| | | |
|---|---|---|
| *B29C 73/00* | (2006.01) | |
| *B32B 43/00* | (2006.01) | |
| *B29C 65/00* | (2006.01) | |
| *B32B 37/00* | (2006.01) | |
| *C09J 5/02* | (2006.01) | |
| *F16L 55/16* | (2006.01) | |
| *B65C 3/26* | (2006.01) | |
| *F16L 55/165* | (2006.01) | |

(Continued)

(52) U.S. Cl.
CPC ........ *F16L 55/1651* (2013.01); *B29C 63/0069* (2013.01); *B29C 63/26* (2013.01); *B29C 63/34* (2013.01); *B29C 63/36* (2013.01); *B29C 65/4835* (2013.01); *B29C 66/5221* (2013.01)

(58) Field of Classification Search
CPC .... F16L 55/1651; F16L 55/179; F16L 55/165; F16L 55/1654; B29C 63/26; B29C 63/34; B29C 63/36; B29C 63/0069; B29C 65/48; B29C 65/4835; B29C 66/5221; B29L 2023/006; E03F 2003/065
USPC ........... 156/60, 94, 156, 160, 165, 166, 176, 178,156/196, 199, 212, 214, 215, 217, 218, 229,156/285, 287, 293, 294, 296, 303.1, 307.1,156/307.3, 307.7, 324; 138/97, 98

See application file for complete search history.

(56) References Cited

U.S. PATENT DOCUMENTS 6,619,886 B1 * 9/2003 Harrington ............... 405/184.2
7,360,559 B2    4/2008 Driver
(Continued)

FOREIGN PATENT DOCUMENTS

| JP | 06-114938 | 4/1994 |
|---|---|---|
| KR | 10-2007-0047211 | 5/2007 |

OTHER PUBLICATIONS

Written Opinion for International (PCT) Patent Application No. PCT/US2011/046159, issued Feb. 5, 2013.

*Primary Examiner* — Philip Tucker
*Assistant Examiner* — Brian R Slawski
(74) *Attorney, Agent, or Firm* — Nyemaster Goode, P.C.

(57) ABSTRACT

An apparatus that accelerates curing of resin in a liner for a buried pipe includes a lining assembly connected to a pressurized fluid source. One embodiment includes an inversion cap having an inversion port, a curing port and a drainage port. The apparatus also includes a manifold having an outlet, a first inlet in valved fluid communication with a heated fluid source, a second inlet in valved fluid communication with a pressurized fluid source and a third inlet in valved fluid communication with the drainage port. While heated fluid enters the first end of the assembly via the (Continued)

manifold, a release fitting which allows fluids to escape through the second end thereof.

14 Claims, 14 Drawing Sheets

Related U.S. Application Data

(60) Provisional application No. 61/369,439, filed on Jul. 30, 2010, provisional application No. 61/417,878, filed on Nov. 29, 2010.

(51) Int. Cl.
| | | |
|---|---|---|
| *B29C 65/48* | (2006.01) | |
| *B29C 63/26* | (2006.01) | |
| *B29C 63/34* | (2006.01) | |
| *B29C 63/36* | (2006.01) | |
| *B29C 63/00* | (2006.01) | |

(56) References Cited

U.S. PATENT DOCUMENTS

| | | |
|---|---|---|
| 2005/0098909 A1 | 5/2005 | Kiest |
| 2007/0095472 A1* | 5/2007 | Kamiyama et al. .......... 156/294 |

\* cited by examiner

APPARATUS AND METHOD FOR HEAT CURING OF PIPE LINERS

CROSS REFERENCE TO RELATED APPLICATIONS

This application is a Continuation-in-Part of U.S. application Ser. No. 13/195,566 filed Aug. 1, 2011 now U.S. Pat. No. 9,074,719, which application is a Non-Provisional Application of U.S. Provisional Application No. 61/369,439 filed Jul. 30, 2010 and U.S. Provisional Application No. 61/417,878 filed Nov. 29, 2010, which are incorporated herein by reference.

BACKGROUND OF THE INVENTION

Installing a liner to repair a buried pipe while it remains underground involves inserting a liner into the pipe and forcing the liner into engagement with the inner walls of the pipe by inflating a bladder. The liner is impregnated with curable resins prior to insertion and the bladder must remain inflated until the resin cures. The time required for resin to cure ranges from three to eight hours, depending upon ambient temperatures.

Thus there is a need for an apparatus and method that provides a shorter curing time regardless of ambient temperatures.

SUMMARY OF THE INVENTION

The long-standing but heretofore unfulfilled need for an apparatus and method that shortens resin curing times is now met by a new, useful, and non-obvious invention.

The invention includes, in a first embodiment, an inversion cap having an inversion port, a curing port and a drainage port. A remote source of pressurized fluid is placed in fluid communication with the inversion port. The apparatus also includes a manifold having an outlet, a first inlet in valved fluid communication with a heated fluid source, a second inlet in valved fluid communication with a pressurized fluid source and a third inlet in valved fluid communication with the drainage port. The distal end of the inversion tube is equipped with and end-release fitting which allows heated fluids to escape there through.

In an alternate embodiment the invention includes an apparatus and method that shortens resin curing times using steam. The apparatus include an inversion cap having an inversion port and a drainage port. A remote source of pressurized steam is placed in fluid communication with a curing port on the inversion head. The distal end of the inversion tube is equipped with and end-release fitting which allows heated fluids to escape there through.

It is also contemplated that the described methods can be used in non-inversion systems (such as pull-in-place repairs) as well. Therefore, another embodiment of the invention includes a lining assembly having an outer tubular liner impregnated with a curable resin, an inner malleable inflatable bladder, having a substantially open first end and a partially open second end, positioned longitudinally within said outer liner and an apertured release fitting secured within the opening in the second end of the tubular liner.

An alternative embodiment of this invention includes a calibration tube, having a first end and a second end, disposed between the inflatable bladder and the tubular liner. The second end of the calibration tube is closed by securing it to the release fitting, with the second end of the inflatable bladder sandwiched there between. After curing, removal of the system by retracting the inflatable bladder causes the calibration tube to invert.

Heated fluids are used in all preceding embodiments. Accordingly, the invention also includes an improved calibration tube which enhances safety and functionality under such conditions. The calibration tube includes a tubular body, interior seam and exterior seam. The calibration tube is sufficiently pliable and heat resistant to function as inversion tube or lining tube in any of the embodiments discussed above.

The calibration tube is manufactured by taking a heat resistant, yet pliable, sheet material and forming a tube having an over-lapping joint. A first strip of heat resistant, yet pliable, sheet material is cut to form the interior seam and bonded to the overlapping joint along its entire length on the interior of the body. A second strip of heat resistant, yet pliable, sheet material is cut to form the exterior seam and bonded (such as by seam-taping or other known methods) to the overlapping joint along its entire length on the exterior of the body. In a preferred embodiment, the heat resistant, yet pliable, sheet material used for the body is the same material used to produce the interior seam and exterior seam.

BRIEF DESCRIPTION OF THE DRAWINGS

For a fuller understanding of the nature and objects of the invention, reference should be made to the following detailed disclosure, taken in connection with the accompanying drawings, in which:

FIG. 4A is a side plan view of an illustrative curing cap installed in an inversion head with the flexible tube extending there through;

DETAILED DESCRIPTION OF THE PREFERRED EMBODIMENT

Figure 1:
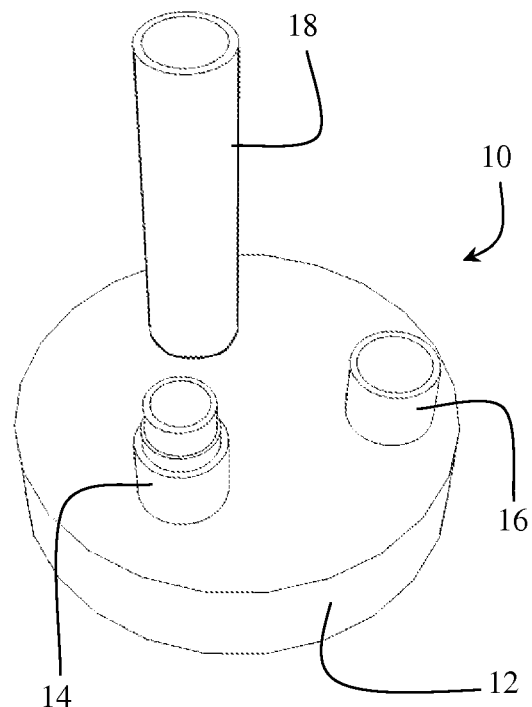
FIG. 1 is a perspective view of an illustrative curing cap.
Figure 2:
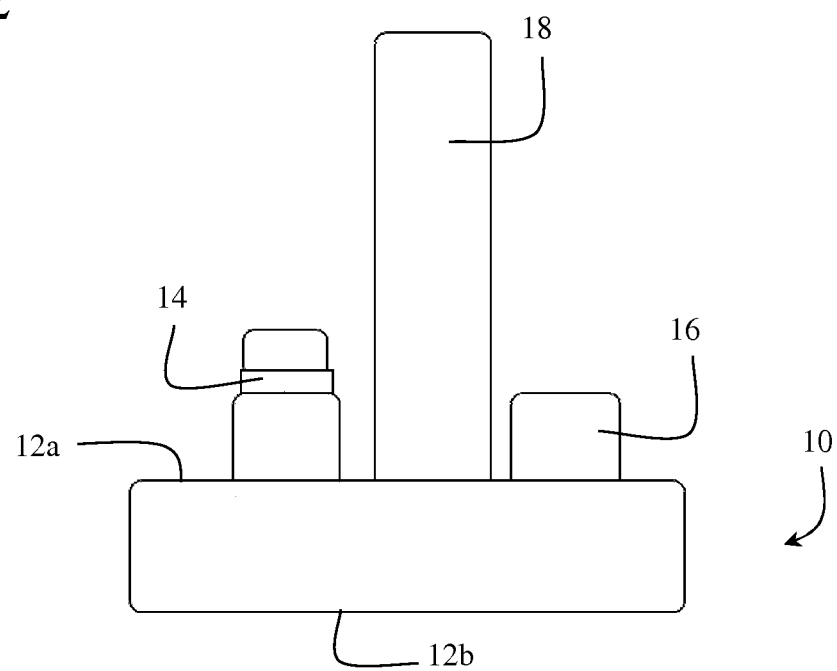
FIG. 2 is a side plan view of an illustrative curing cap.
Figure 3A:
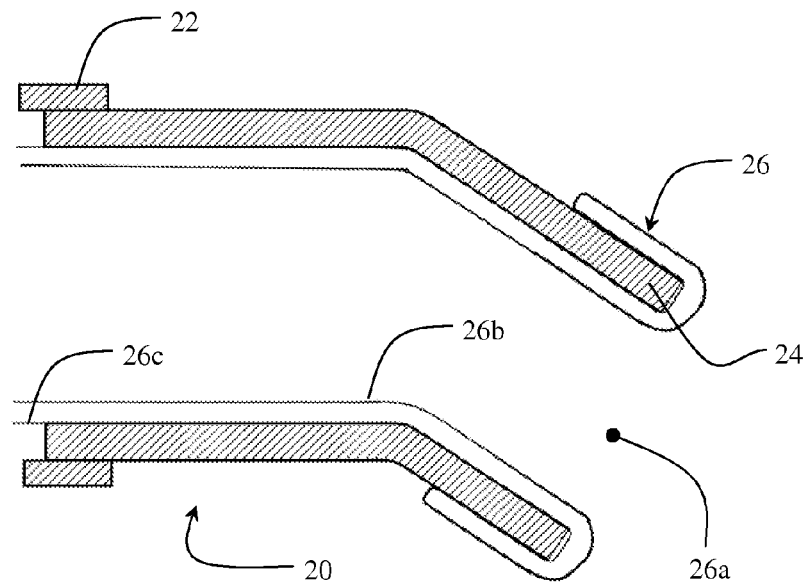
FIG. 3A is a side plan view of an inversion head, with an un-inverted tubular liner positioned thereon.

While the present invention is shown for use with sewer pipeline repair, the present invention can be utilized for repairing other types of pipes, ducts, tunnels and shafts, such as gas, water, oil, steam and compressed air conduits. FIGS. 1 and 2 depict an illustrative embodiment of the novel curing cap which is denoted as a whole by the reference numeral 10. Curing cap 10 includes substantially circular body 12 having an outer side 12a and inner side 12b. Outer side 12a further includes inflation port 14, curing port 16 and discharge port 18. All ports are preferably arranged to provide unidirectional fluid communication between outer side 12a and inner side 12b of circular body 12. Inner side 12b of circular body 12 is received by intake 22 of inversion head 20 (FIG. 3A). Discharge end 24 releasably engages the interior of open end 26a of liner tube 26.

Two types of liner tubes are commonly used. The first type of liner comprises a felt or fiberglass lining, having a closed end and an open end impregnated with a curable resin. The second type includes a lining composition of two (2) main layers; a first layer comprising an inflatable bladder having a closed end and an open end, and a second layer of felt or fiberglass lining that is impregnated with a curable resin.

Liner tube 26 preferably comprises a felt layer (26b) and a plastic layer (26c) as is known in the art. The felt layer is adapted to absorb a liquid resin, and the plastic layer is adapted to provide an impervious smooth continuous surface. Prior to inverting the liner tube, the plastic layer is located on the outside of the liner tube and the felt layer is located on the inside. During the inversion process (described below), the liner tube 26 is inverted so that the felt layer is on the outside of the liner tube and the smooth plastic layer is on the inside of the liner tube. Use of an impermeable coating on the liner tube allows the liner tube to be inflated and inverted without the use of a separate bladder. In embodiments using an inflatable bladder, the bladder overlies the felt lining and is contact with plastic layer 26c.

Prior to inversion, intake 22 of inversion head 20 is connected (via a tubular conduit) to a liner dispensing unit (which normally include a source of pressurized air). The dispensing unit holds the length of resin soaked liner prior to delivery. During inversion, the air under pressure flows through the system from the dispensing unit toward inversion head 20.

Figure 3B:
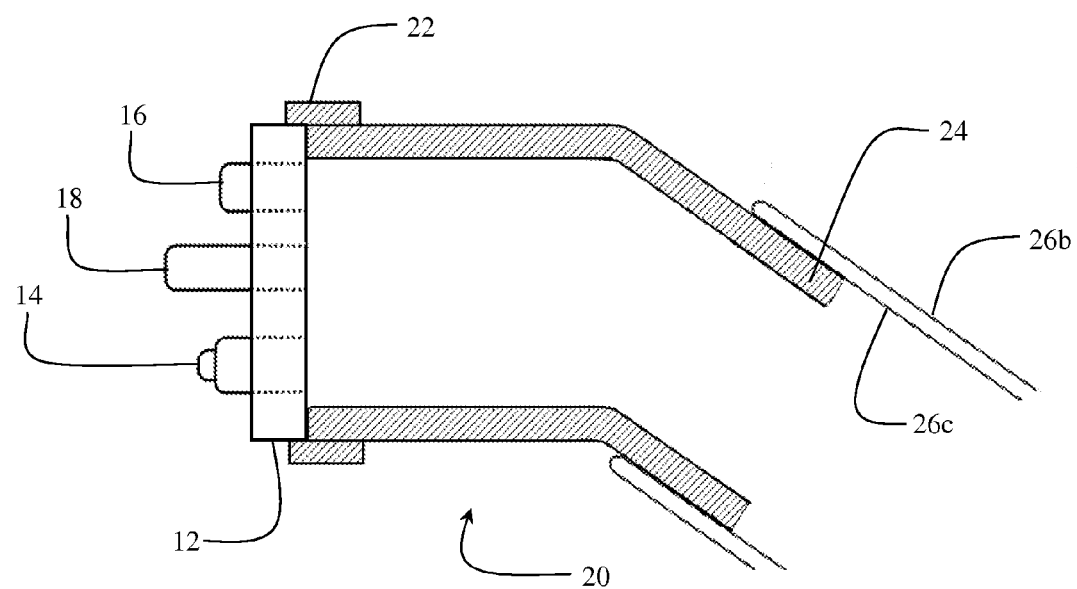
FIG. 3B is a side plan view of an illustrative curing cap installed in an inversion head, which is in turn installed in the open end of an liner tube.

As shown in FIG. 3A, open end 26a of liner tube 26 is fitted over discharge end 24 of inversion head 20 and is secured in place to create an airtight connection there around ensuring the air under pressure causes the closed leading end of liner tube 26 (not shown) to follow a path of travel through curing cap 20 into the interior or lumen of the pipe, thereby inverting said liner as said closed end is propelled to the distal end of the pipe by said heated fluid under pressure (see FIG. 3B).

Accordingly, liner tube 26 is fully inverted along its entire extent when the closed end of liner tube 26 reaches the distal end of the pipe. The rubber layer or uncoated lining layer now forms the interior surface of liner tube 26 and the resin-impregnated outer layer now forms the exterior layer and is pressed against the inner sidewalls of the pipe by the pressure of said gaseous or liquid fluid.

Air from the inversion compressor further causes liner tube 26 (or bladder/liner combination) to expand radially so that the resin coated surface of liner tube 26 comes into contact with the interior of the pipe to be repaired. Air pressure is continued, either directly against the interior of the liner (or inflatable bladder) to force the resin-coated surface of liner tube 26 into contact with the interior of the pipe.

Figure 4A:
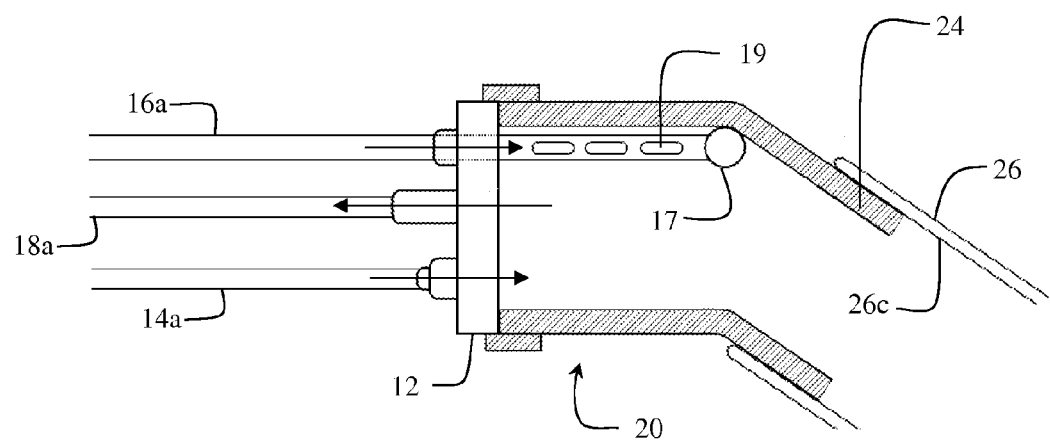
Figure 4B:
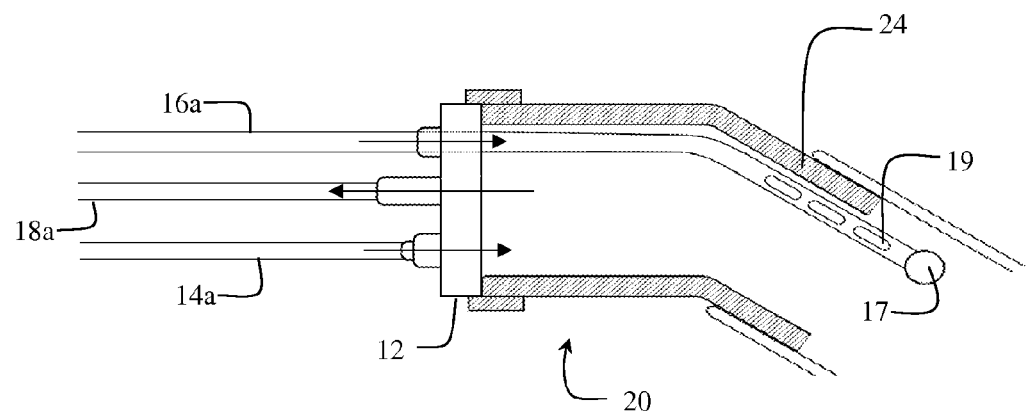
FIG. 4B is a side plan view of an illustrative curing cap installed in an inversion head with the flexible tube extending there through and into the lumen of the tubular liner.

Once liner tube 26 is fully inverted, inversion head 20 is uncoupled from the dispensing unit and compressed air source. Turning now to FIG. 4A, curing cap 10 is then coupled with intake 22 of inversion head 20 (FIG. 3B). Inflation port 14 is connected to an air compressor, not shown, via airline 14a. Air from the compressor maintains the pressure within liner tube 26 to keep the resin-coated surface (26b) of liner tube 26 in contact with the interior of the pipe.

Curing port 16 is connected, via flexible curing tube 16a, to manifold 30 (see FIG. 5), which is in turn in fluid communication with a heated fluid source and an air compressor, not depicted. In an alternative embodiment, however, it is possible to use a single air compressor connected to the manifold to provide connections to both inflation port 14 and curing port 16. Curing port 16 is preferably of a slip-ring configuration, but can be adapted for any configuration that allows curing curing tube 16a to slide through curing port 16 while maintaining a substantially fluid-tight seal.

Drainage port 18 is also connected to manifold 30 and provides fluid communication, via drainage line 18a, from the interior of the pipe outward to manifold 30.

Figure 5:
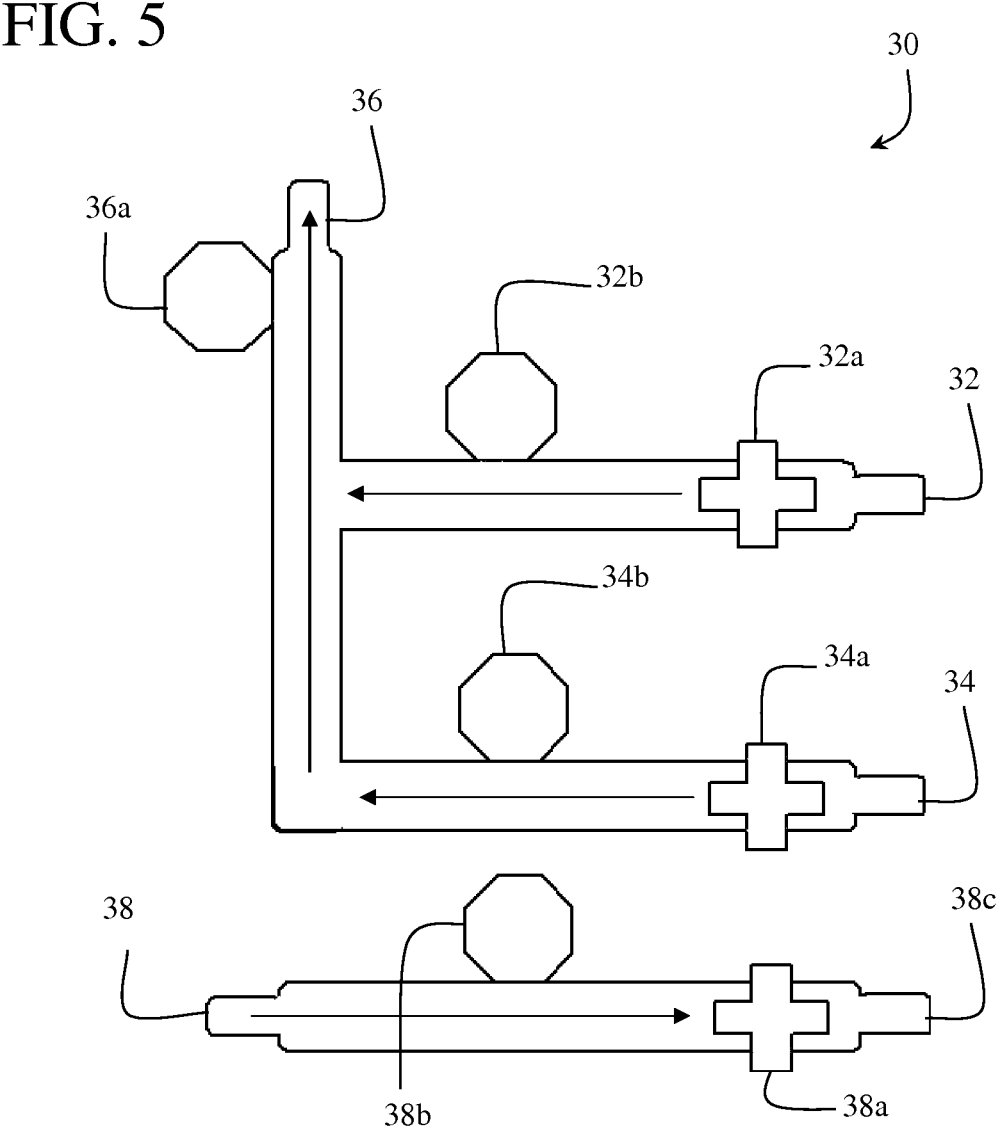
FIG. 5 is a diagrammatic view of an illustrative manifold.

Manifold 30, FIG. 5, includes heat inlet 32, air inlet 34 and outlet 36. Heat inlet 32 is in fluid communication with a heating source which provides heated fluid (i.e. hot water or steam) to the system. The flow of heated fluid into the system is controlled by heat valve 32a, and the temperature and/or pressure of the heated fluid is monitored by gauge 32b. Air inlet 34 is in fluid communication with a drainage air compressor which provides air, under pressure, to the system. The flow of air under pressure into the system is controlled by air valve 34a, and the temperature and/or pressure of the air is monitored by gauge 34b. As previously stated, the drainage air compressor can be replaced by the inversion air compressor using linkages as known in the art. Both heat fluid inlet 32 and air inlet 34 are in open fluid communication with outlet valve 36. For example, when heat valve 32a is open then heated fluid is permitted to pass through manifold 30 thereby exiting outlet 36 and entering the system via curing tube 16a.

Manifold 30 also includes drainage inlet 38, connected to drainage line 18, which further comprises drainage valve 38a and temperature/pressure gauge 38b. Fluids leaving the system via drainage line 18a can be monitored via gauge 38b and disposed of when safe through drainage outlet 38c.

Another aspect of the inventive method occurs after liner tube 26 has been inverted and is being held against the sides of the pipe under pressure. This aspect includes the steps of inserting curing tube 16a into the lumen of liner tube 26, opening heat valve 32 so that heated fluid flows through manifold 30, via outlet 36, into curing tube 16a and into the lumen of liner tube 26.

Curing tube 16a is an elongate flexible tube including substantially spherical guide 17 at its distal end. Curing tube 16a also includes a series of perforations (19) proximal to spherical guide 17. Once liner tube 26 is fully extended, curing tube 16*a* is fed through curing port 16 thereby advancing guide 17 through the lumen of liner tube 26. The substantially spherical shape of guide 17 allows the distal end of the tube to easily navigate corners and bends. Once properly positioned, the heated fluid passes through curing tube 16*a* and out perforations 19 into the lumen of liner tube 26 near its distal end. This ensures liner tube 26 is heated from the distal (closed) end toward the proximal (open) end.

As the heated fluid fills the lumen of the liner tube from the distal end, the air under pressure used to invert the liner tube is permitted to escape through drainage port 18 and back to manifold 30 via drainage line 18*a*. Gauge 38*a* is monitored as the fluids (air under pressure, steam or hot water) pass there through. When the gauge shows the temperature of the drainage fluids are substantially equal to the temperature of the heated fluid entering the system, this indicates that the heated fluid has reached the proximal end of liner tube 26. It can now be assumed liner tube 16 is now substantially filled said heated fluid. Heat valve 32*a* and drainage valve 38*a* can then be closed, fully or partially, so that liner tube 26 is not over-pressurized. The resin cures within a significantly abbreviated time because the heat of the heated fluid is conducted by the inflatable bladder (or plastic liner layer (26*c*) into the resin-impregnated layer (26*b*) where it acts as a catalyst.

When the resin has sufficiently cured, drainage valve 36*a* is opened to allow the lumen of the liner tube to be emptied. To facilitate drainage, air valve 34*a* is opened forcing air under pressure through perforations 19 in the distal end of curing tube 16*a*. This air under pressure forces any remaining heated fluid through drainage port 18, through line 18*a* and into drainage inlet 38*a*. Inversion head 20 and curing cap 10 can be removed once all heated fluids are removed from the lumen of liner tube 26.

In yet another embodiment, shown in FIGS. 6-10, the invention includes a method of curing of pipe liners wherein a heated fluid, such as water, is introduced at a first end of the lining system and discharged (at least partially) at a second end of the lining system.

As with the previous embodiment, open end 26*a* of liner tube 26 is secured to discharge end 24 of inversion head 20. Intake 22 is connected to an inversion device (not shown), including a pressurized inversion air source, as is known in the art. Liner tube 26 is inverted as described above and the air under pressure causes the closed leading end of liner tube 26 to follow a path of travel through the interior or lumen of the pipe, thereby inverting said liner as said closed end is propelled by said gaseous or liquid fluid under pressure to the distal end of pipe. Accordingly, plastic layer 26*c* now forms the interior surface of liner tube 26 and resin-impregnated outer layer 26*b* now forms the exterior layer and is pressed against the inner sidewalls of the pipe by the pressure of said gaseous or liquid fluid.

Figure 6:
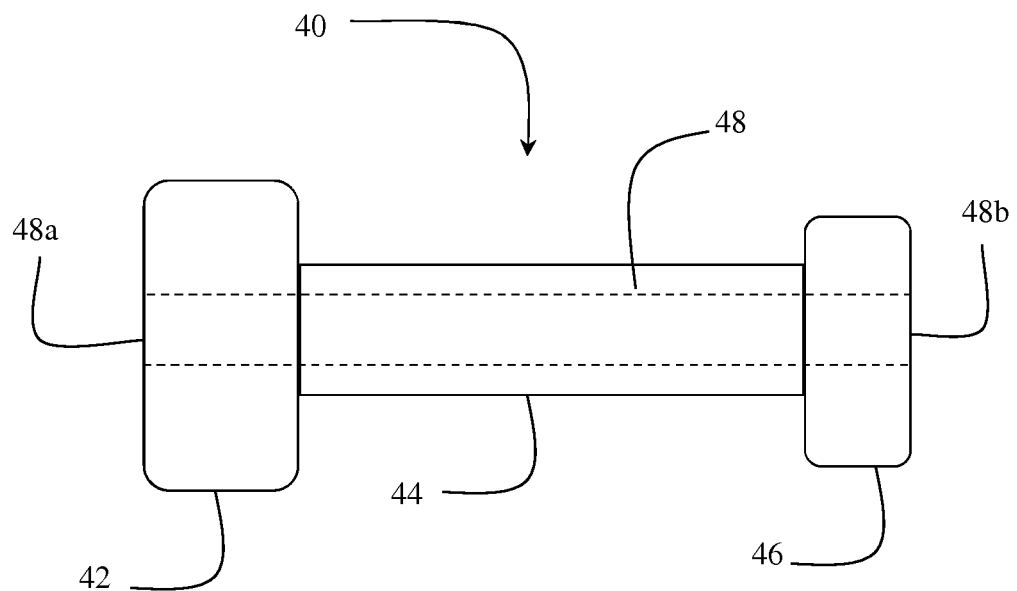
FIG. 6 is a perspective view of an illustrative end release fitting.
Figure 7:
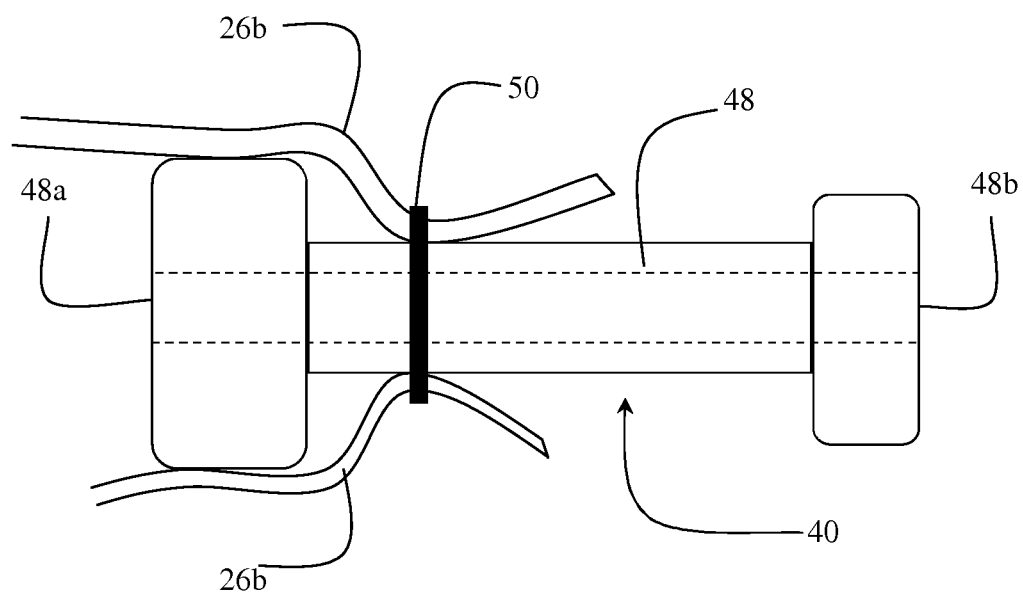
FIG. 7 is a diagrammatic view of an illustrative end release fitting engage with the distal end of an inversion or lining tube.

Liner tube 26 is fully inverted along its entire extent when distal end 26*d* of liner tube 26 extends into the lumen of the pipe past the portion in need of repair. In this embodiment, distal end 26*d* is at least partially open with the opening preferably coupled to release fitting 40. As shown in FIG. 6, release fitting 40 includes inner body 42, shaft 44 and outer body 46. Central aperture 48 runs throughout the length of fitting 40 and has inner opening 48*a* and outer opening 48*b*. As shown in FIG. 7, distal end 26*d* of liner tube 26 is coupled (e.g. pinched or clamped via securing device 50) around shaft 44 of fitting 40. Fluid communication is maintained between the lumen of liner tube 26 and the lumen of the pipe via aperture 48.

Figure 8:
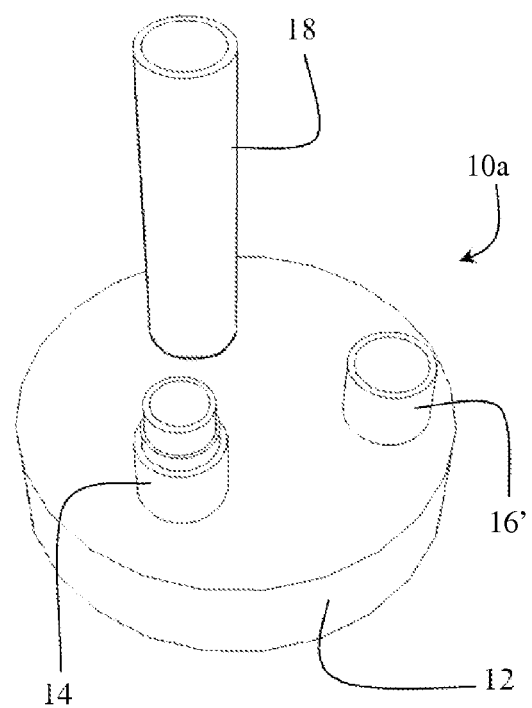
FIG. 8 is a perspective view of an illustrative curing end cap according to one embodiment of the invention.
Figure 9:
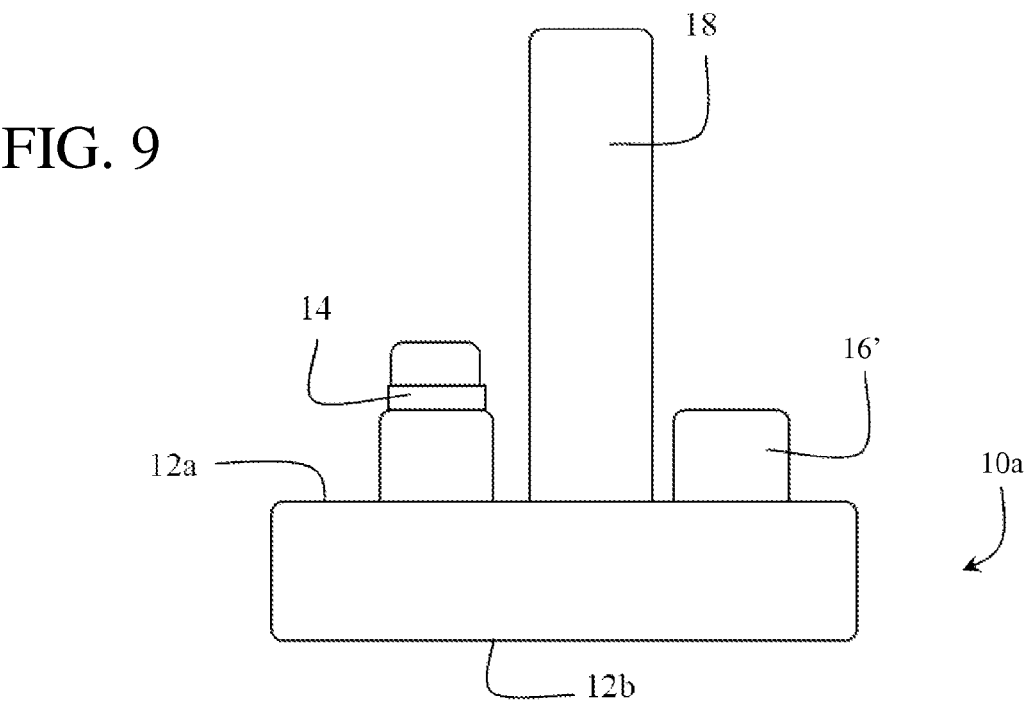
FIG. 9 is a side plan view of an illustrative curing end cap according to one embodiment of the invention.
Figure 10:
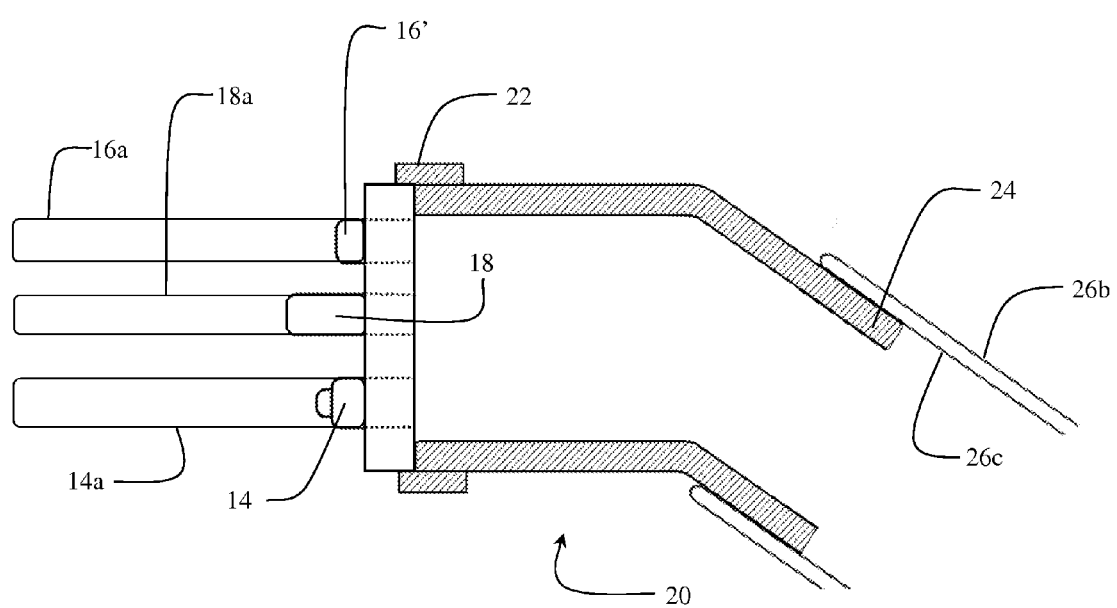
FIG. 10 is a side plan view of the illustrative apparatus of FIGS. 7 and 8 installed in an inversion head, which is in turn installed in the open end of an inversion tube.

According to one variation of this embodiment, however, liner tube 26 is not "pinched off" or clamped near open end 26*a* when decoupling inversion head 20 from the inversion device and connecting the curing cap (10*a*), as described above since maintaining air pressure within liner tube 26 is not required. Instead, the inversion device is decoupled from intake 22 of inversion head 20 and replaced with curing cap 10*a* (FIGS. 8 and 9). Pressure is then re-established within the lumen of inversion tube through inflation port 14, as discussed below.

Inflation port 14 is connected to any source of pressurized fluid, not shown, via inflation line 14*a*. Pressurized fluid passing through inflation line 14*a* and inflation port 14 causes liner tube 26 (or bladder/liner combination) to expand radially thereby pressing resin coated surface 26*b* of liner tube 26 into contact with the interior of the pipe to be repaired. Pressure is continued to maintain contact between resin-coated surface 26*b* of liner tube 26 and the interior of the pipe.

Curing port 16' is connected, via curing line 16*a*, to a heated fluid source (not shown). In this embodiment, the fluid is preferably water. This connection may also be made with manifold 30 (see FIG. 5), which is in turn connected in fluid communication with the heated fluid source and a non-heated fluid source under pressure (not shown). In an alternative embodiment, however, it is possible to use a single pressurized fluid source connected to the manifold to provide connections to both inflation port 14 and curing port 16' as long as the fluid in curing line 16*a* is heated prior to entering the lumen of liner tube 26. Curing port 16' need not be of a slip-ring configuration, as in the previous embodiment. Rather, curing port 16' is of any type that provides a connection to line 16*a*. Curing port 16 provides substantially uni-directional fluid communication between the heated fluid source, via line 16*a* and possibly manifold 30, to the interior of inversion head 20. Discharge port 18 is also connected to manifold 30 and provides fluid communication, via discharge line 18*a*, from the interior of inverted liner tube 26 outward to manifold 30.

After liner tube 26 has been inverted and is being held against the sides of the pipe under pressure from inflation line 14*a*, heat valve 32 on manifold 30 is opened so that heated fluid flows through manifold 30, via outlet 36, into curing line 16*a*, through curing port 16 into the interior of inversion head 20 and then into the lumen of liner tube 26.

As the heated fluid fills the lumen of the inversion tube from open end 26*a*, the fluid under pressure used to inflate the inversion tube is displaced distally through fitting 40. All fluids, heated and non-heated, can also exit the system through discharge port 18 and back to manifold 30, via discharge line 18*a*, if the inflow of heated fluid into the lumen of liner tube 26 exceeds the rate at which fluids can pass through fitting 40. Gauge 38*a* is monitored as the fluids (air under pressure, steam or hot water) pass there through. When the gauge shows the temperature of heated fluid (i.e. water) exiting the system is substantially equal to the temperature of the heated fluid entering the system, this indicates the heated fluid has reached the proximal end of liner tube 26. At this point liner tube 26 is filled with the heated fluid. Heat valve 32*a* remains open during curing and drainage valve 38*a* can be adjusted to maintain the proper pressure within liner tube 26. The resin cures at an extremely accelerated rate because the heat of the heated fluid is conducted by the rubber layer and/or plastic layer into the resin-impregnated layer and said heat acts as a curing catalyst.

When the resin has sufficiently cured, heat valve 32a is closed. Drainage valve 38a can be opened to allow the lumen of the liner tube to be emptied. To facilitate drainage, air valve 34a is opened forcing fluid under pressure through liner tube 26. This air under pressure forces any remaining heated fluid through fitting 40 and/or discharge port 18, through line 18a and into drainage inlet 38. Inversion head 20 and curing cap 10a can be removed once all heated fluids are removed from the lumen of liner tube 26.

Figure 11:
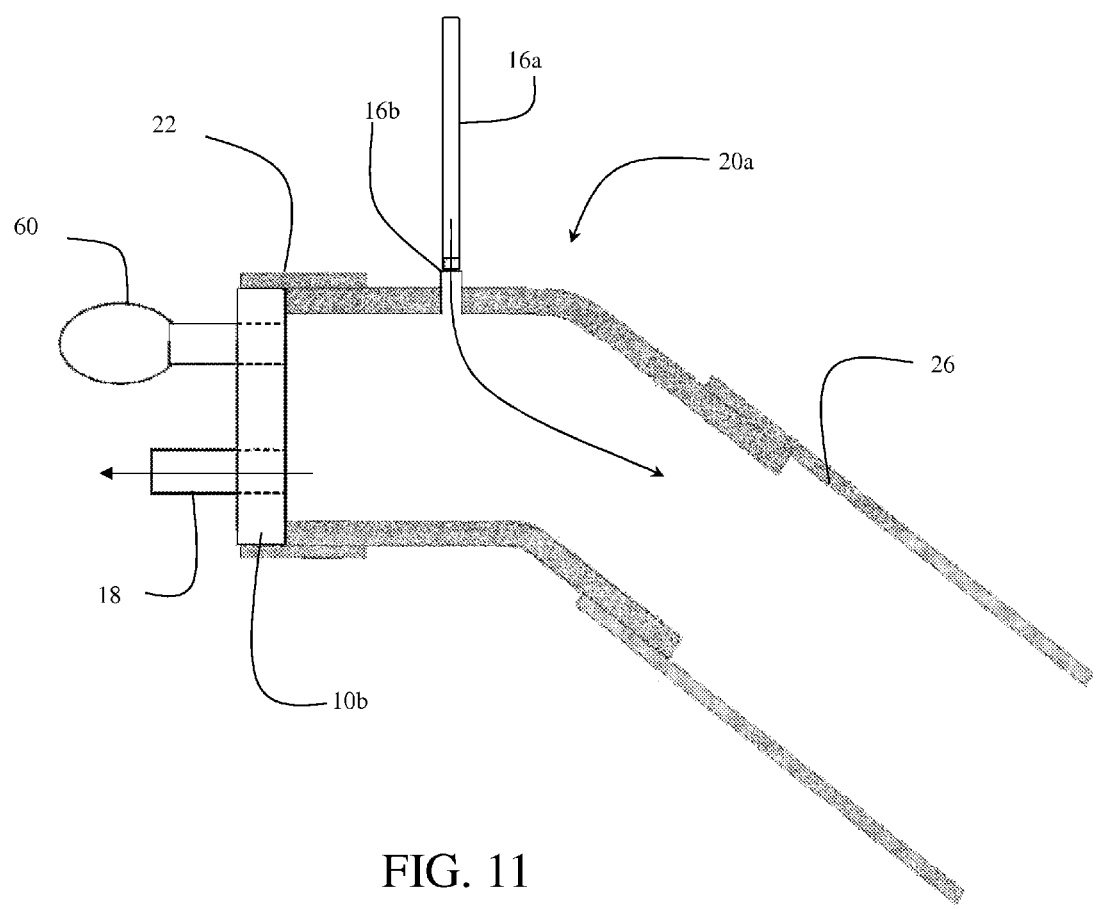
FIG. 11 is a side plan view of an illustrative curing end cap according to one embodiment of the invention.
Figure 12:
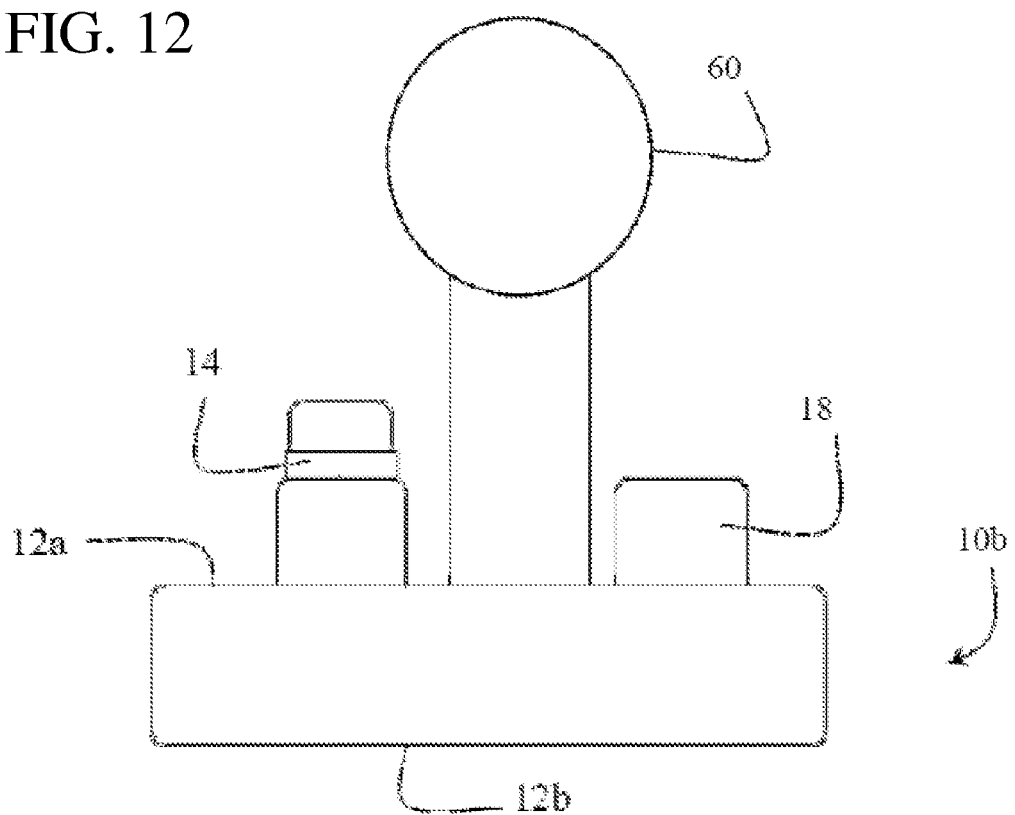
FIG. 12 is a side plan view of the illustrative apparatus of FIG. 10 installed in an illustrative inversion head, which is in turn installed in the open end of an inversion tube.
Figure 13:
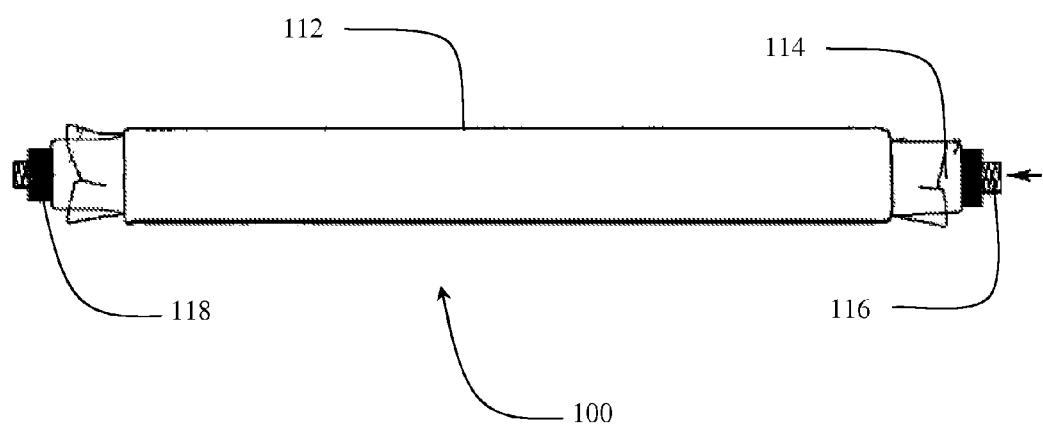
FIG. 13 is a perspective view of a pull-in-place pipe lining system.
Figure 14:
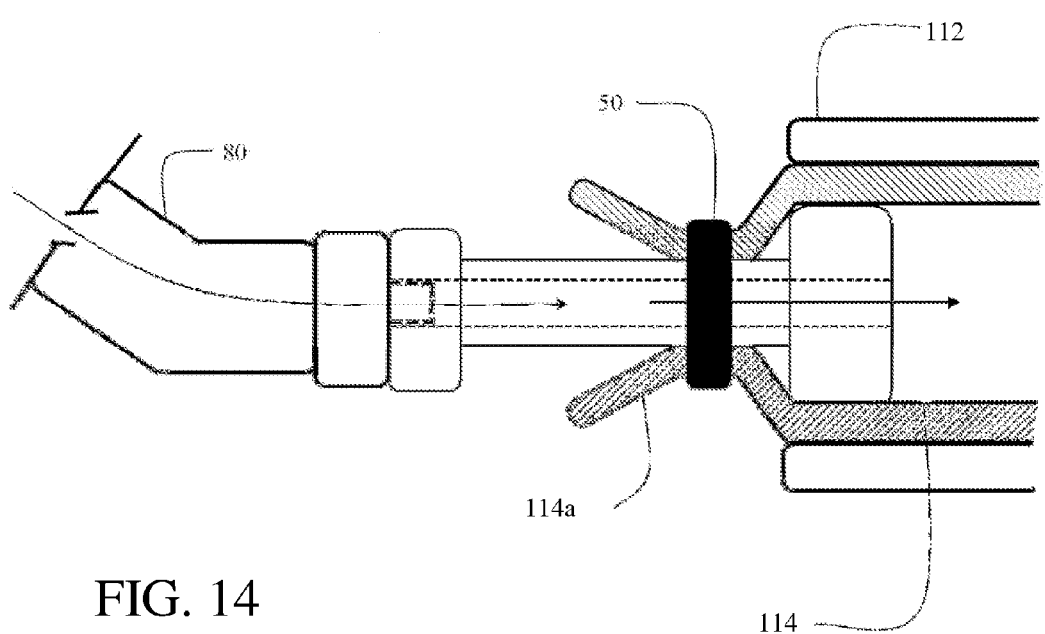
FIG. 14 is a side plan view of a steam-curing fitting installed in the proximal end of a lining tube.

The invention also includes a method of curing of pipe liners wherein a super-heated fluid (such as steam) is introduced at a first end of the lining system and discharged (at least partially) at a second end of the lining system. An illustration of this embodiment is shown in FIGS. 11 and 12.

Open end 26a of liner tube 26 is secured to the discharge end 24 of steam-curing inversion head 20a and intake 22 is connected to an inversion device (not shown), including a pressurized inversion air source, as is known in the art. Therefore, the air under pressure causes distal end 26d of liner tube 26 to follow a path of travel through the interior or lumen of the pipe, thereby inverting said liner as said closed end is propelled by said gaseous or liquid fluid under pressure to the distal end of pipe.

Accordingly, liner tube 26 is fully inverted along its entire extent when distal end 26d of liner tube 26 reaches the distal end of the pipe. As with the preceding embodiment, instead of distal end 26d of liner tube 26 being closed it is instead coupled to release fitting 40 (FIGS. 6 and 7).

Again, liner tube 26 is not "pinched off" or clamped as before as maintaining air pressure within liner tube 26 is not required. The inversion device is then decoupled from inversion head 20a. Curing cap 10b (FIGS. 11 and 12) is then coupled with intake 22 of inversion head 20a.

Inflation port 14 is connected to a pressurized fluid source, not shown, via an inflation line (not shown). Pressurized fluid passing through the inflation line and inflation port 14 causes liner tube 26 (or bladder/liner combination) to press outwardly so that the resin coated surface of liner tube 26 comes into contact with the interior of the pipe to be repaired. Air pressure is continued, either directly against the interior of the liner or inversion bladder, to force the resin-coated surface of liner tube 26 into contact with the interior of the pipe.

Next, curing inlet 16b on inversion head 20a is connected, via curing line 16a, to manifold 30 (see FIG. 5), which is in turn connected in fluid communication with a steam generator and/or a pressurized fluid source, not depicted. Curing port 16b is of any type that provides a connection to line 16a and can withstand the heat and pressure of steam curing. Curing port 16d provides fluid communication from manifold 30, via line 16a, to the interior of inversion head 20a. Discharge port 18 is also connected to manifold 30 and provides fluid communication, via a drainage line (not shown), from the interior of the tubular liner 26 outward to manifold 30. Gauge 60 is used to monitor the pressure/temperature within inversion head 20a.

Another aspect of the method occurs after liner tube 26 has been inverted and is being held against the sides of the pipe under pressure. This aspect includes the steps of opening heat valve 32 on manifold 30 so that super-heated fluid flows through manifold 30, via outlet 36, into line 16a, through curing port 16b into the interior of inversion head 20a and then into the lumen of liner tube 26.

As the heated fluid fills the lumen of the inversion tube from open end 26a, the fluid under pressure used to inflate the inversion tube is permitted to escape through fitting 40 (see FIG. 7). Air and/or water can also exit the system through discharge port 18 and back to manifold 30, via release line 18a, if the inflow of heated fluid into the lumen of liner tube 26 exceeds the rate at which air can pass through fitting 40. Gauge 38a is monitored as the fluids (air under pressure, steam or hot water) pass there through. When the gauge shows the temperature of super-heated fluid (i.e. steam) exiting the system is substantially equal to the temperature of the heated fluid entering the system, this indicates that the super-heated fluid has reached the proximal end of liner tube 26, indicating that said tube is now filled with said super-heated fluid. Heat valve 32a remains open and drainage valve 38a can then be adjusted so that liner tube 26 is not over-pressurized. The resin cures at an extremely accelerated rate because the heat of the heated fluid is conducted by the rubber layer or liner into the resin-impregnated layer and said heat acts as a catalyst.

When the resin has sufficiently cured, heat valve 32a is closed. Drainage valve 36a can be opened to allow the lumen of the inversion tube to be emptied. To facilitate drainage, air valve 34a is opened forcing air under pressure through liner tube 26. This air under pressure forces any remaining heated fluid through fitting 40 or discharge port 18, through line 18a and into drainage inlet 38a. Inversion head 20 and curing cap 10a can be removed once all heated fluids are removed from the lumen of liner tube 26.

Still another embodiment of the invention includes a method of curing of non-inverted pipe liners, referred to as "pull-in-place" systems. Varied methods of trenchless pipe repair methods are known in the art. Accordingly, one aspect of the invention includes a liner assembly for pipeline repair as shown in FIGS. 13 through 17. In a general embodiment, the pull-in-place system comprises an outer tubular liner; an inner malleable inflatable bladder positioned longitudinally within said liner; and a generally non-stretchable strap positioned longitudinally within the malleable inflatable bladder, said strap restricting longitudinal over-expansion during positioning and inflation of the liner assembly within a pipeline.

In contrast the inversion methods described previously, the pull-in-place system of an illustrative embodiment (designated generally as element 100, see FIG. 13) includes outer tubular liner 112, inner malleable inflatable bladder 114 positioned longitudinally within said outer liner, a unitary elongate substantially non-stretchable retaining sleeve 118, positioned within and along the length of the inner malleable inflatable bladder, said retaining sleeve being configured to prevent radial over-expansion of the liner assembly during inflation of the inner bladder, and a generally non-stretchable strap 116 extending longitudinally within the inner bladder (optional). Strap 116 is not required because retaining sleeve 118 is configured to restrict longitudinal over-expansion of the liner assembly during positioning of the liner assembly within a pipeline and subsequent inflation of the inner bladder.

Figure 15:
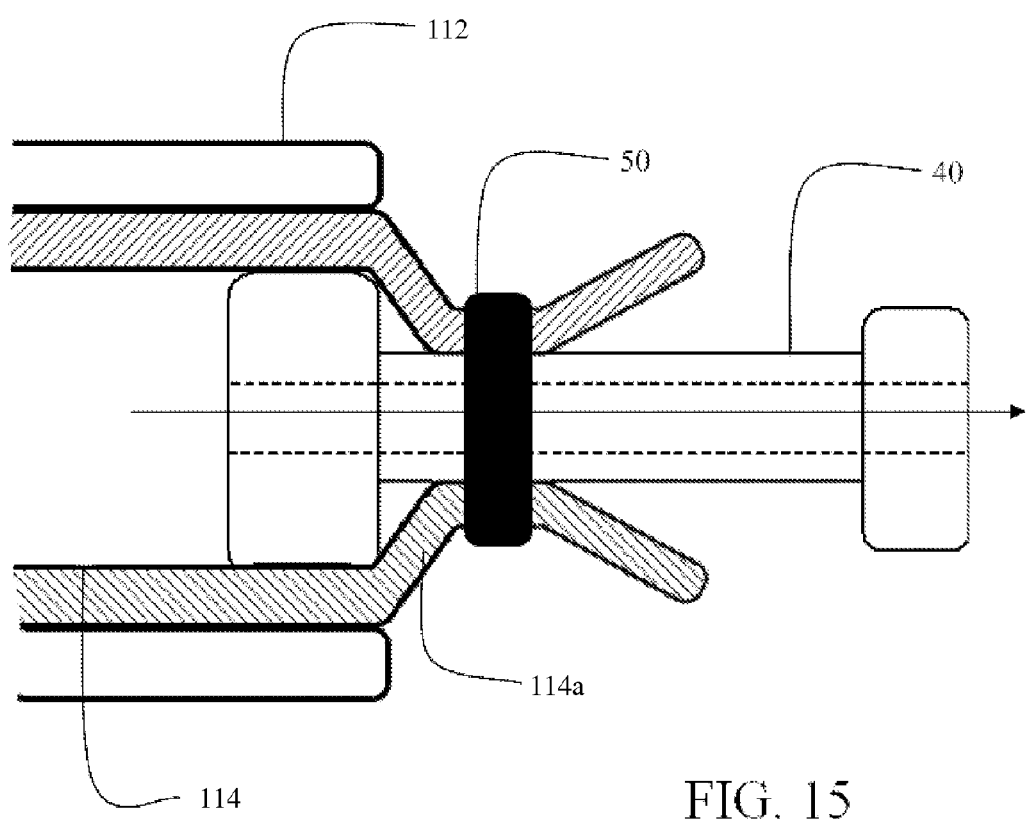
FIG. 15 is a side plan view of an end-release fitting installed in the distal end of a lining tube.

Once positioned within the pipe to be repaired, a super-heated fluid (such as steam) is introduced at a first end of the lining system (FIG. 14) and discharged (at least partially) at a second end of the lining system (FIG. 15). System 100 is positioned (pulled in place) within the lumen of the pipe to be repaired. Proximal end 114a of inflatable bladder 114 is secured to the discharge end of steam-curing fitting 80. Distal end 114b of inflatable bladder 114 is secured to fitting 40. Fitting 80 is connected to a pressurized air source (not shown) and the air under pressure causes inflatable bladder 114 to expand radially along its entire extent. As with the preceding embodiment, instead of distal end 114b of inflatable bladder 114 being closed it is instead coupled to release fitting as shown in FIG. 15.

Air from a compressor passing through the inflation line and inflation fitting 80 causes inflatable bladder 114 (or bladder/liner combination) to press outwardly so that the resin coated surface tubular liner 112 comes into contact with the interior of the pipe to be repaired. Air pressure is continued to maintain contact between the resin-coated surface of liner 112 and the interior of the pipe. The pressurized air source is then removed from fitting 80. A steam generator (not shown) is then coupled to fitting 80 via a curing line. Alternatively, fitting 80 is connected to a manifold via a curing line which is in turn coupled to a source of heated fluid under pressure. The relative flow of all fluids in the system can be controlled via the manifold.

After liner 112 is held against the sides of the pipe under pressure, super-heated fluid (steam) flows through fitting 80 into the interior of inflatable bladder 114. As the heated fluid fills the lumen of inflatable bladder 114 from proximal end 14a, the air under pressure for inflation is displaced through fitting 40. The resin in liner 112 cures at an extremely accelerated rate because the heat of the heated fluid is conducted by the rubber layer or liner into the resin-impregnated layer and said heat acts as a catalyst.

When the resin has sufficiently cured, the flow of super-heated fluid is discontinued. Preferably, pressurized air is reintroduced into inflatable bladder 114 to ensure the super-heated fluid is discharged and it is safe to remove.

Figure 16:
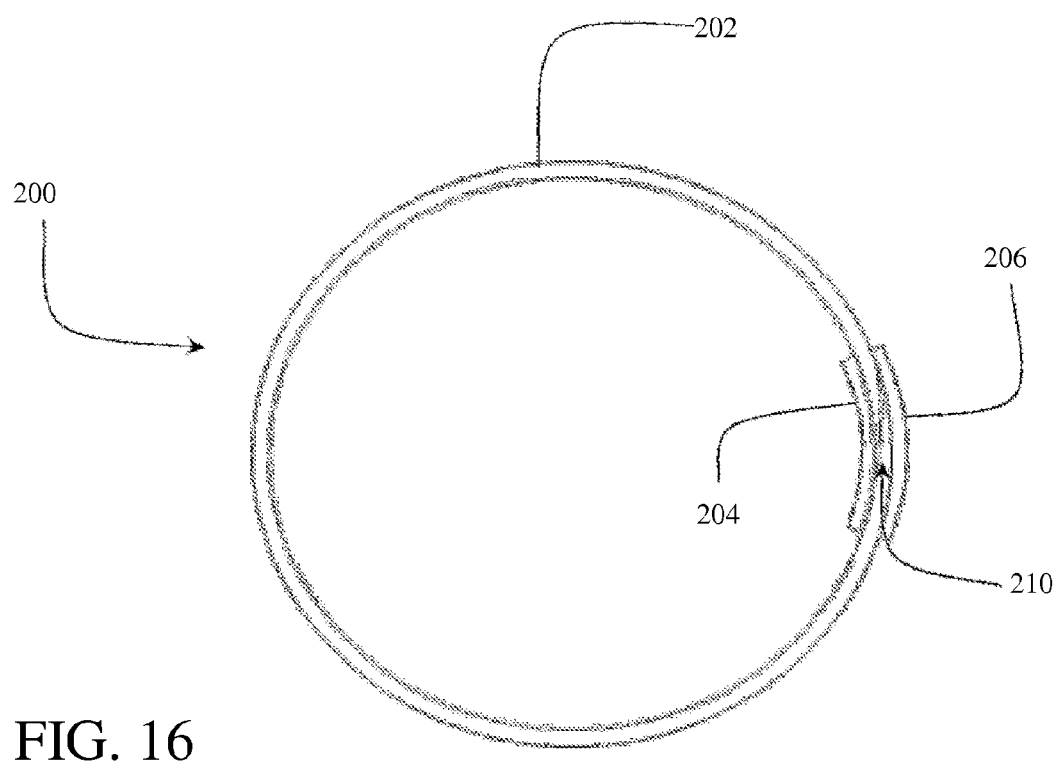
FIG. 16 is a cross-section view of an inventive calibration tube according to one embodiment of the invention.

Heated fluids are used in all preceding embodiments. Accordingly, the invention also includes an improved calibration tube which enhances safety and functionality under such conditions. Calibration tube 200 includes tubular body 202, interior seam 204 and exterior seam 206 (FIG. 16).

Calibration tube 200 is manufactured by taking a heat resistant, yet pliable, sheet material and forming a tube having over-lapping joint 210. Joint 210 is preferably bonded or stitched along its length. A first strip of heat resistant, yet pliable, sheet material is cut to form interior seam 204 and bonded to overlapping joint 210 along its entire length on the interior of body 202. A second strip of heat resistant, yet pliable, sheet material is cut to form exterior seam 206 and bonded (such as by seam-taping or other known methods) to overlapping joint 210 along its entire length on the exterior of body 202. In a preferred embodiment, the heat resistant, yet pliable, sheet material used for body 102 is the same material used to produce interior seam 204 and exterior seam 206.

Figure 17:
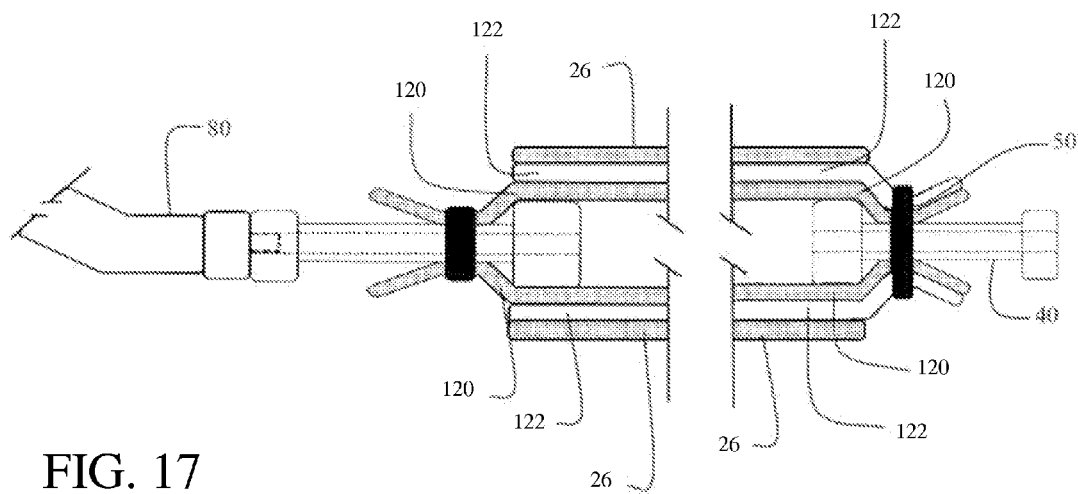
FIG. 17 is a side plan view of an illustrative pull-in-place steam curing system using a first and second calibration tube.

Calibration tube 200 is sufficiently pliable and heat resistant to function as an inflatable to be used inside a liner tube of the disclosed inversion methods, or as the inflatable bladder 114 and/or retaining sleeve 118 in the pull-in-place method discussed above. For example, FIG. 17 represents an alternate embodiment of the invention of FIG. 14. Here, the inflatable bladder is replaced with first calibration tube 120 and is fastened at both ends. Second calibration tube 122 is placed in overlying relation (radially) to first calibration tube 120 and is only fastened at the distal end to fitting 40. Resin soaked liner 26 is then placed in overlying relation (radially) to second calibration tube 122.

Upon removal of the system, after curing, the proximal end is pulled causing fitting 40 at the distal end to move back through the lumen of the pipe. This movement causes second calibration tube 122, but not first calibration tube 100a, to invert as it is withdrawn.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed is:

1. A method of repairing a damaged section of a pipe, comprising:
    providing a tubular liner having a substantially open first end and an at least partially open second end;
    providing a curing cap;
    impregnating the tubular liner with a curable resin;
    inverting the tubular liner by applying a first fluid under pressure from the first end to the second end of the tubular liner causing it to invert into the lumen of the pipe to be repaired;
    pressing the inverted tubular liner into contact with the pipe;
    operatively connecting the curing cap to the first end of the tubular liner after the tubular liner is inverted and pressed against the pipe;
    establishing fluid communication between the open first end of the tubular liner and a source of a heated fluid under pressure via the curing cap;
    passing the heated fluid through the curing cap and into the lumen of the inverted tubular liner; and
    allowing the heat from the heated fluid to contact the curable resin;
    wherein the heated fluid entering the lumen of the inverted tubular liner displaces the first fluid through the opening in the second end of the tubular liner.

2. The method of claim 1 further comprising the steps of:
    providing an inflatable bladder surrounding the tubular liner prior to the inversion step; and
    inverting the tubular liner and inflatable bladder into the lumen of the pipe to be repaired such that the tubular liner is in contact with the pipe;
    whereby the heat from the heated fluid passes through the inflatable bladder and contacts the curable resin impregnated in the tubular liner.

3. The method of claim 1, wherein the curing cap comprises:
    a substantially circular body having a first side and a second side;
    an inflation port providing substantially unidirectional fluid communication between a source of the first fluid and the first end of the inverted tubular liner;
    a curing port providing substantially unidirectional fluid communication between the source of the heated fluid and the first end of the inverted tubular liner; and
    a release port providing substantially unidirectional fluid communication between the first end of the inverted tubular liner and the exterior of the pipe.

4. The method of claim 3, wherein the curing cap further comprises a gauge adapted to measure the pressure within the lumen of the inverted tubular liner.

5. The method of claim 1, wherein the curing cap is in fluid communication the first end of the inverted tubular liner through an inversion head.

6. The method of claim 1, further comprising providing an apertured release fitting secured within the opening in the second end of the inverted tubular liner.

7. The method of claim 6, wherein the release fitting comprises:
- a leading end having a predetermined diameter;
- a trailing end having a predetermined diameter;
- a shaft connecting the leading and trailing ends, wherein the shaft has a diameter smaller than either the leading or trailing end; and
- a substantially centered aperture extending from the leading end to the trailing end through the shaft;
- wherein the substantially centered aperture provides fluid communication between the lumen of the inverted tubular liner and the lumen of the pipe.

8. The method of claim 7 wherein the predetermined diameter of the leading end of the release fitting is smaller than the predetermined diameter of the trailing end.

9. The method of claim 8, wherein the trailing end of the release fitting rests within the inverted tubular liner when the second end of the tubular liner is secured to the shaft.

10. The method of claim 8, wherein the leading end of the release fitting rests outside the inverted tubular liner when the second end of the tubular liner is secured to the shaft.

11. The method of claim 1, further comprising the step of connecting the first end of the tubular liner to a first end of an inversion head, wherein the inversion head further comprises; a second end connected to the curing cap providing substantially unidirectional fluid communication between the source of the heated fluid and the first end of the inverted tubular liner.

12. The method of claim 11, wherein the curing cap comprises:
- a substantially circular body having a first side and a second side;
- an inflation port providing substantially unidirectional fluid communication between a source of the first fluid and the first end of the inverted tubular liner; and
- a release port providing substantially unidirectional fluid communication between the first end of the inverted tubular liner and the exterior of the pipe.

13. The method of claim 12, wherein the curing cap further comprises a gauge adapted to measure the pressure within the lumen of the inverted tubular liner.

14. A method of repairing a damaged section of a pipe, comprising:
- providing a tubular liner having a substantially open first end and an at least partially open second end;
- providing a curing cap including an inflation port, a curing port, a release port, and a gauge adapted to measure the temperature;
- impregnating the tubular liner with a curable resin;
- inverting the tubular liner by applying a first fluid under pressure from the first end to the second end of the tubular liner causing it to invert into the lumen of the pipe to be repaired;
- pressing the inverted tubular liner into contact with the pipe;
- operatively connecting the curing cap to the first end of the tubular liner after the tubular liner is inverted and pressed against the pipe;
- establishing fluid communication between the open first end of the tubular liner and a source of a heated fluid under pressure via the curing port of the curing cap;
- passing the heated fluid through the curing cap and into the lumen of the inverted tubular liner;
- allowing the heat from the heated fluid to contact the curable resin; and
- measuring the temperature of a fluid exiting through the discharge port of the curing cap with the gauge to determine whether the liner is substantially filed with the heated fluid.

* * * * *